US011677642B2

(12) United States Patent
O'Flaherty et al.

(10) Patent No.: US 11,677,642 B2
(45) Date of Patent: Jun. 13, 2023

(54) AUTOMATED SUPPORT SYSTEM FOR CONNECTED DEVICES

(71) Applicant: SWEEPR TECHNOLOGIES LIMITED, Dublin (IE)

(72) Inventors: Jerome O'Flaherty, Cellbridge (IE); James Hannon, Drumcondra (IE); John Maguire, Blackrock (IE); Alan Coleman, Portmarknock (IE)

(73) Assignee: Sweepr Technologies Limited, Dublin (IE)

( * ) Notice: Subject to any disclaimer, the term of this patent is extended or adjusted under 35 U.S.C. 154(b) by 0 days.

(21) Appl. No.: 17/634,357

(22) PCT Filed: Aug. 11, 2020

(86) PCT No.: PCT/EP2020/072522
§ 371 (c)(1),
(2) Date: Feb. 10, 2022

(87) PCT Pub. No.: WO2021/028442
PCT Pub. Date: Feb. 18, 2021

(65) Prior Publication Data
US 2022/0286371 A1  Sep. 8, 2022

(30) Foreign Application Priority Data

Aug. 12, 2019 (EP) .................................. 19191280

(51) Int. Cl.
*H04L 41/16* (2022.01)
*H04L 41/5074* (2022.01)
(Continued)

(52) U.S. Cl.
CPC ........ *H04L 41/5074* (2013.01); *H04L 41/046* (2013.01); *H04L 41/16* (2013.01); *H04L 51/216* (2022.05)

(58) Field of Classification Search
CPC ... H04L 41/5074; H04L 41/046; H04L 41/16; H04L 51/216
(Continued)

(56) References Cited

U.S. PATENT DOCUMENTS

2013/0262082 A1* 10/2013 McKeeman ............ G06F 40/20
704/9
2017/0201578 A1* 7/2017 Wesley ................ G06F 3/1454

FOREIGN PATENT DOCUMENTS

WO          00/74193 A1   12/2000

OTHER PUBLICATIONS

International Search Report issued in PCT/EP2020/072522; dated Oct. 22, 2020.

* cited by examiner

*Primary Examiner* — Adnan M Mirza
(74) *Attorney, Agent, or Firm* — Studebaker & Brackett PC (57) ABSTRACT

An automated support system for local networks of connected devices has local network agents each comprising a digital processor, a memory, a local communications wireless interface for communicating locally with devices in the local network, and remotely with cloud-based servers. The servers include an interface for communicating with the local networks, and a recommendation engine programmed to dynamically communicate with the local network agents via the interface to capture support requests concerning devices and services, to perform work flow processing to generate a resolution for such support requests, and to communicate the resolution to the local network agent. The (Continued)

recommendation engine automatically generates a context for each support request, the context including historical resolution data for that local network, or device, or service. The interface and the local network agents perform local network synchronization with very low bandwidth overhead by the agents asynchronously generating and transmitting a signature to the interface to indicate status of all of the devices in their respective network. The recommendation engine has a series of components arranged to operate in sequence to process a support request.

23 Claims, 6 Drawing Sheets

(51) Int. Cl.
  *H04L 51/216* (2022.01)
  *H04L 41/046* (2022.01)
(58) Field of Classification Search
  USPC .......................................................... 709/206
  See application file for complete search history.

AUTOMATED SUPPORT SYSTEM FOR CONNECTED DEVICES

INTRODUCTION

The invention relates to support for connected devices in local networks, especially devices in the home or small business. In this specification the term "local network" is used for a group of connected devices with internet connectivity, such as in a home or small business.

A problem at present is that, in a building, devices vary in terms of their connectivity to the internet and in terms of their user diagnostics capabilities.

The invention is directed towards providing an automated support system for local networks to address these issues.

Glossary of Terms

Incident. A time-stamped combination of an Issue Type and the specific care points affected by that issue Interaction. A single continuous use of the system by a user consisting of a series of Steps Issue. A support request technical problem or question to be resolved Issue Type. A categorization of an Issue into a specific class of support request (e.g. "buffering", "onboarding", "disconnected")

Journey. The one or more Interactions with the automated support system that an end user has to have in order to resolve an issue MQTT. This is a message bus that is used to carry an Interaction instance NLP. Natural language processing. The processing of spoken or written word into a series of words that define the user's intent NLTK. A software toolkit to support natural language processing Step. Any single exchange between the end user and the system or between the system and an external system.

Use Case. A specific Issue that the system has been configured to resolve

User Input. A single Utterance, tap, swipe or text entry from an end user

Utterance. One specific type of User Input, being a single spoken input from an end-user (typically routed to an NLP engine)

SUMMARY

We describe an automated support system as set out in claims 1 to 29, and a method as set out in claim 30, and a non-transitory computer storage medium as set out in claim 31.

We describe an automated support system for local networks of connected devices, the system comprising:
  a plurality of local network agents each comprising a digital processor, a memory, a local communications wireless interface for communicating locally with devices in the local network, and remotely with cloud-based servers,
  a group of one or more servers with digital processors, Internet communication interfaces, memory, and storage, configured to provide:
    an interface for communicating with the local networks,
    a recommendation engine configured to dynamically communicate with the local network agents via said interface to capture support requests concerning devices and services, to perform work flow processing to generate a resolution for such support requests, and to communicate the resolution to the local network agent.

Preferably, the recommendation engine is configured to automatically generate a context for each support request, the context including historical resolution data for that local network, or device, or service.

Preferably, the interface (10) and the local network agents are configured to perform local network synchronisation with low bandwidth overhead by the agents asynchronously generating and transmitting a signature to the interface to indicate status of all of the devices in their respective network.

Preferably, said synchronisation is performed so that only previously un-recorded device data needs to be synchronised, hence ensuring low bandwidth in maintaining a local network context in real time.

Preferably, each agent is configured to automatically generate a signature of identifiers of all of its associated devices if there has been no change in device or state since the last upload, and to upload a full device and state dataset if there has been a change.

Preferably, the state data includes device speeds, connectivity status, overall local network status, and usage-related related statistics about how and when devices are used.

Preferably, each agent is configured to maintain connectivity of all devices in its local network, including for devices which are not configured to directly communicate with the internet by being at local network edges.

Preferably, the recommendation engine comprises a series of components arranged to operate in sequence to process a support request, said components comprising:
  a selection component configured to select a device or service applicable to the support request,
  an issue detection component configured to detect an issue for the support request,
  a resolution selection component configured to select a resolution to the issue, and
  a resolution execution component configured to communicate with the local network agent for resolving the issue of the support request by execution of a resolution rule.

Preferably, said selection component and said issue detection component each comprises a Natural Language Processing engine and a core entity model to identify a relevant device or service or issue by using synonyms for known devices and services and issues stored on the recommendation engine and being configured for interaction with the local network agent if the device or service or issue is unknown or ambiguous; and said components are configured to automatically generate a context for each of the selected device or service and the selected issue, said context being an enriched data set that is fed to the resolution selection component.

Preferably, the resolution selection component is configured to execute rules matched to the context to return a listing of matching resolutions, and to apply prioritisation to a plurality of matching resolutions based on a machine learning mechanism.

Preferably, said resolution selection component is configured to select resolutions which are either fixed rules that are created using a resolution recommender tool, or are dynamic rules that use a prediction engine, said prediction engine being a machine learning enabled analytics software tool that uses issues as they are processed to train a model, and then selects the most likely resolution based on the overall context.

Preferably, the resolution execution component is configured to execute a series of steps including diagnostic checks, content, prompts, system actions and branching logic, and comprises a orchestration engine which is configured to execute a resolution flow of steps executed by the recommendation engine and the local network agent; and wherein said resolution component comprise a feedback stage configured to gather feedback from the user and to use diagnostic checks to ensure that the issue is resolved, and then feeds outcome data back into an analytics engine to drive machine learning according to feedback to update an historical context database.

Preferably, the recommendation engine comprises an entity model and is configured to automatically update said entity model including device types, versions and firmware patch versions, service types and how they behave and are layered together in a connected environment, the structure of the entity model being in a hierarchy in which machine learned issue resolution handling on top of this hierarchy allows for the support of both new and known devices and services without need for ongoing maintenance of a potentially complex hierarchy of connected devices and services.

Preferably, the recommendation engine is configured to perform a lightweight distributed processing approach to user-initiated support requests, in which there is a support request issue resolution taxonomy that carries for each context, state, steps to be performed, and data concerning capabilities of the local network and the skill level of the end user.

Preferably, the resolution selection component is configured to generate an instance of a taxonomy, and the resolution selection and the resolution execution component are configured to enrich via a message bus the taxonomy throughout the lifetime of a support request.

Preferably, said components are configured to, for each interaction on said message bus, generate a message topic to link a plurality of hardware devices or systems in the processing of the support request.

Preferably, the system is configured to perform the steps of:
  receiving at the local network agent a support request from a local network device which executes an API to perform intent extraction, the local network agent transmitting a message to an API of the recommendation engine, and from there to an interaction program, which recognizes an interaction in response to the support request,
  the interaction program generating a topic message with a unique identifier linked to the interaction and a message bus sends the topic with an interaction context to the local network device, and
  the recommendation engine subsequently recognizing messages from the local network as relating to this interaction by recognizing the associated topic.

Preferably, each resolution rule is tagged with a set of key words that are used by the recommendation engine to pull an appropriate diagnosis and resolution into a resolution rule, said tags coupling resolutions with a resolution rule, in which some resolution rules share tags.

Preferably, said tags provide a coupling between rule logic and resolution stages to facilitate migration from a rule-based selection mechanism to a machine-learned, data centric, prediction model.

Preferably, the system is configured to generate a context as a collection of attributes that catalog all information gained by the engine in relation to a local network, said attributes taking the form of key:value pairs, in which the keys have been predefined for each device, service, network type and issue type, and the values are imported from a plurality of sources that including NLP aliases that have been matched to user utterances; and/or user profile; and/or data concerning history of processing support requests for the same device or issue type; and data from a diagnostics tool.

Preferably, said diagnostic tool includes a communication data transfer rate tool.

Preferably, the recommendation engine is configured to identify a location in a hierarchy for a device, service or network with a support request issue, and to compare the information in the context to expressions for resolution rules at that place in the hierarchy in order to select a resolution rule appropriate to the issue.

We also describe a method of processing a support request arising from a local network of connected devices, the method being performed by a system of any embodiment described herein, and the method comprising steps of:
  a local network agent each sending a support request to the recommendation engine,
  the recommendation engine dynamically communicating with the local network agent via said interface to capture the support request and performing work flow processing to generate a resolution for the support request, and
  communicating the resolution to the local network agent.

We also describe a non-transitory computer program product storing software code for executing steps of a method as described herein when executed by a digital processor.

DETAILED DESCRIPTION OF THE INVENTION

The invention will be more clearly understood from the following description of some embodiments thereof, given by way of example only with reference to the accompanying drawings in which.

Figure 1:
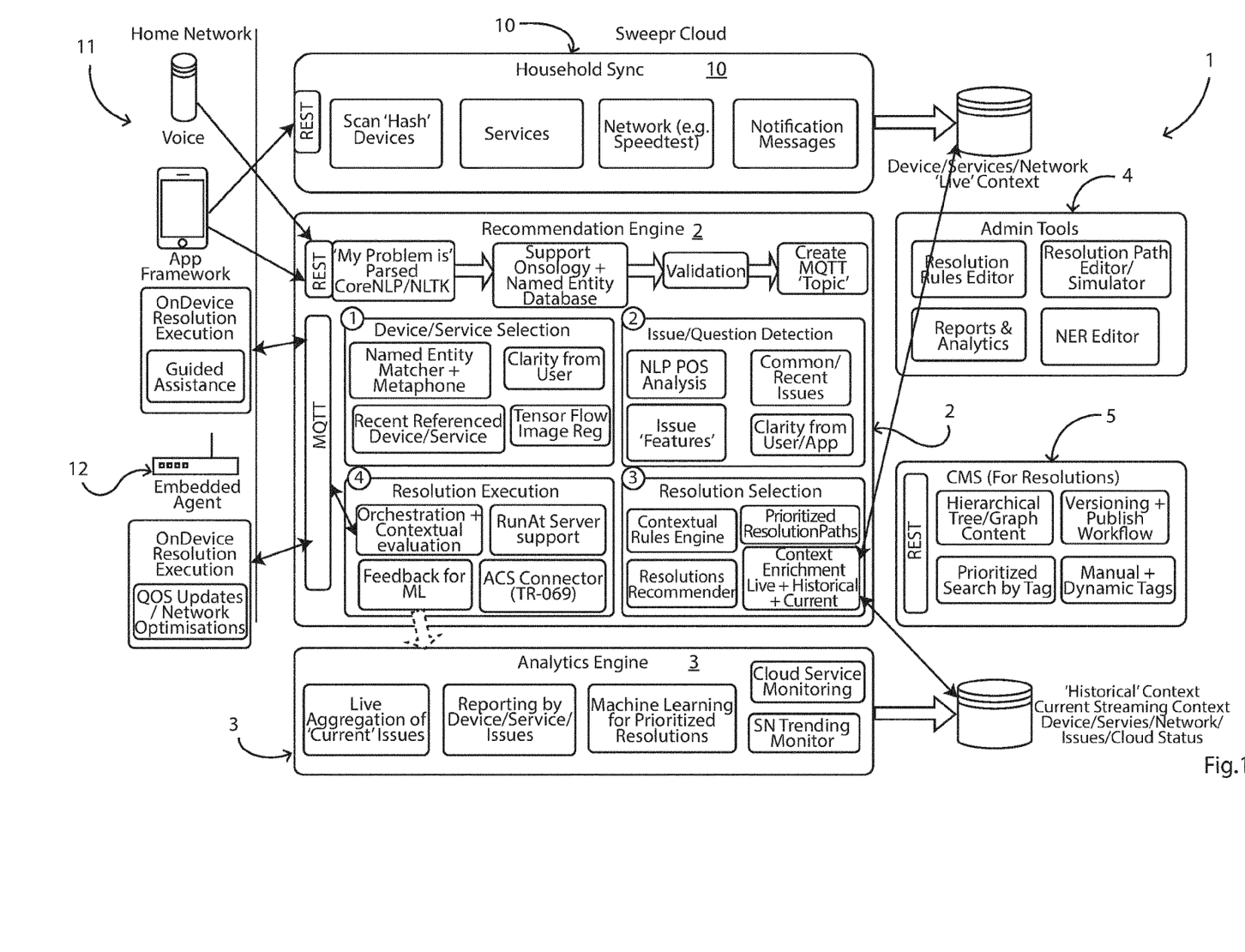
FIG. 1 is a block diagram illustrating components of an automated support system.

Referring to FIG. 1 an automated support system 1 comprises a cloud-based server recommendation engine 2 and a server analytics engine 3. There are also cloud-based administration tools 4 and a content management system (CMS) 5.

The automated support system is for local networks of connected devices. The system has local ("home") network agents 12 each comprising a digital processor, a memory, a local communications wireless interface for communicating locally with devices in the local network, and remotely with cloud-based servers. There is a group of one or more servers with digital processors, Internet communication interfaces, memory, and storage, configured to provide:

an interface 10 for communicating with the local networks 11, a recommendation engine 2 configured to dynamically communicate with the local network agents 12 via said interface to capture support requests concerning devices and services, to perform workflow processing to generate a resolution for such support requests, and to communicate the resolution to the local network agent 12.

The interface 10 is linked with a database 20 for storage of live context data for the local network devices, services and networks.

The functions of the recommendation engine 2 include the following which flow in sequence:
parsing of a query into Core NLP and NLTK code,
support ontology and named entity database,
validation,
creating MQTT logic.

The output from this stream is the creation of an interaction instance specific to the customer's issue, this is passed over the MQTT bus (see FIG. 2) between the engine 2 ("platform") and the other system components, processing the interaction steps as instructed by the configured instance.

Figure 2:
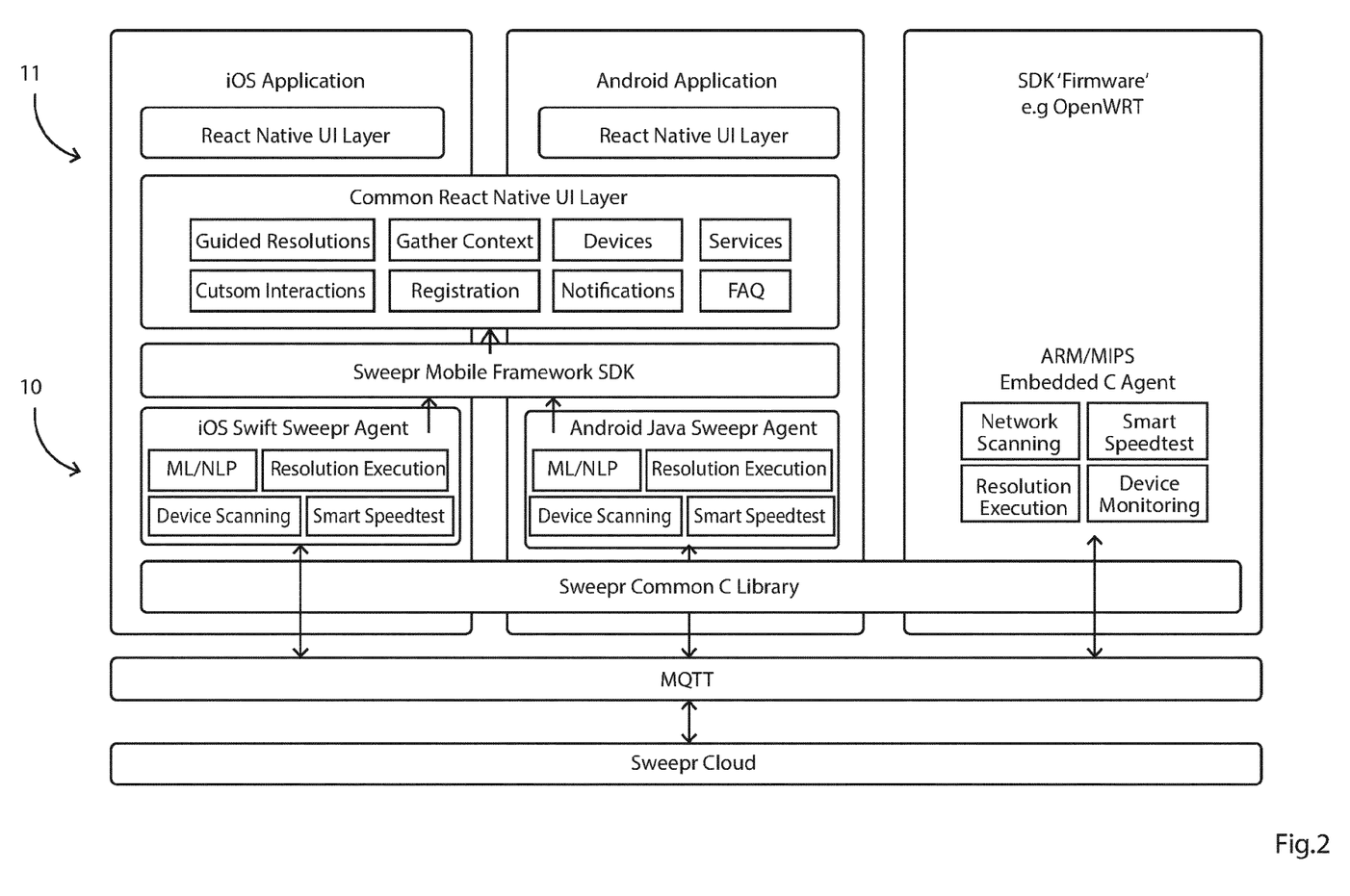
FIG. 2 is a flow diagram showing interactions within the system at a high level.

Communication flows between the interface 10 and the local networks 11 are illustrated generally in FIG. 2. FIG. 2 shows the architecture of the server, in which there is communication via a cloud layer, an MQTT layer, and a common C library ("Sweepr" is the name of the service provided by the engine 2).

Figure 3:
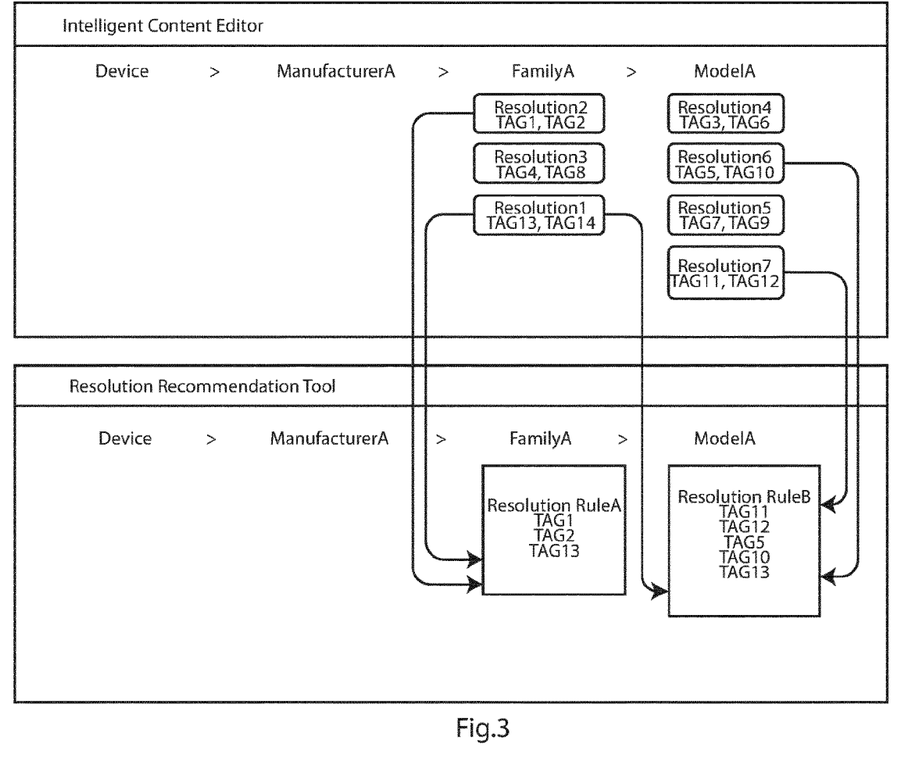
FIGS. 3 and 4 are sample interface screens for the system.

FIG. 3 shows an intelligent content editor and a resolution recommendation tool which are executed by the server 2. Tag ear lined with resolutions as described in more detail below.

Figure 4:
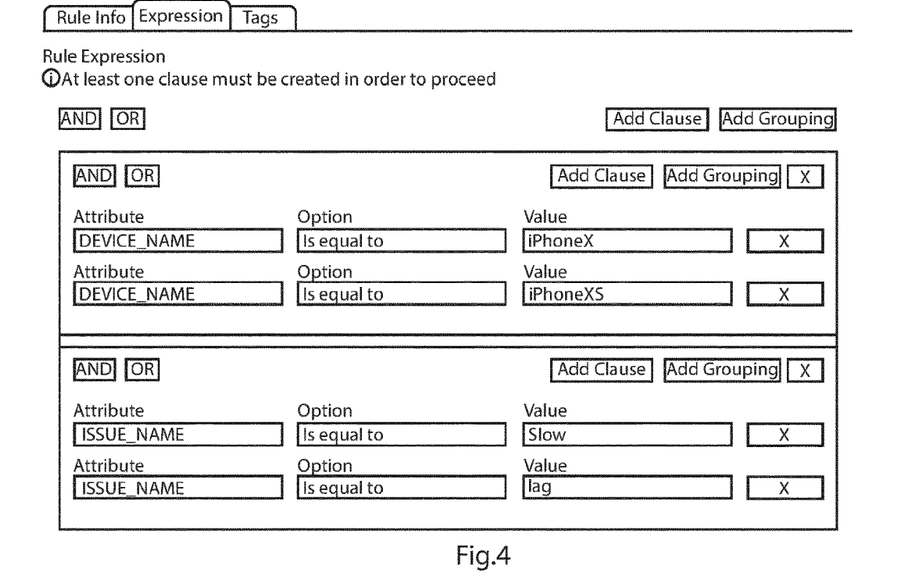

FIG. 4 illustrates rule expressions, for defining devices and issues to be handled.

Figure 5:
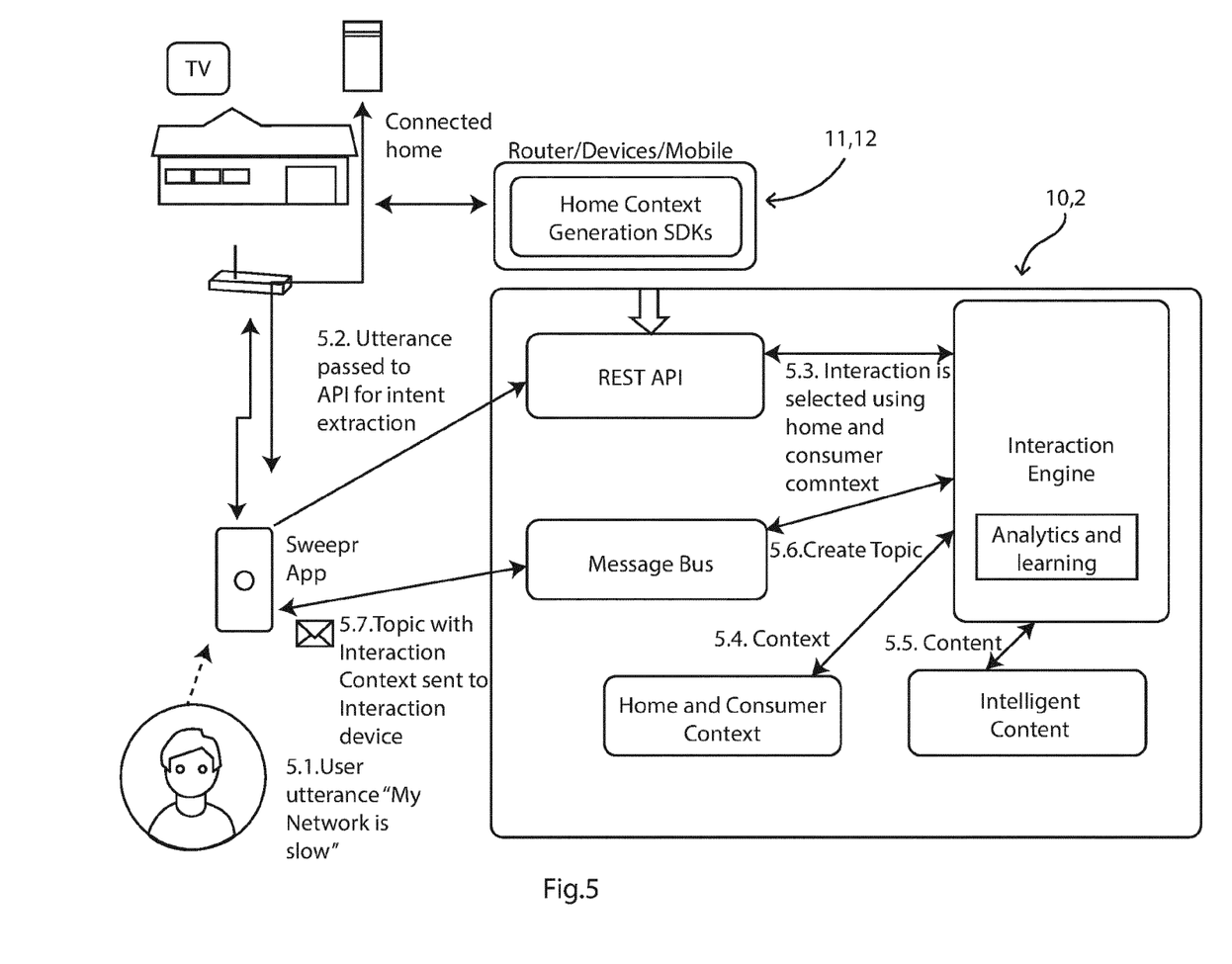
FIG. 5 is a flow diagram illustrating a use case.

FIG. 5 illustrates a path through the system from a local network agent and back in one use case.

The main components of the recommendation engine 2 which are illustrated in FIG. 1 are as follows.

2.1 Device/Service Selection

This component detects the device or service the user is referring to. The engine 2 (or "platform") uses a Natural Language Processing engine along with the core entity model to identify the relevant device or service. This also uses synonyms for device and services which can be created using the platform tools and uses clarification questions back to the user if the stated device or service is unknown or ambiguous. This also uses previously reported issue history to avoid repeated questions and to show knowledge of the user's local network.

Device selection for a given service issue is based on a learned confidence factor that associates device types with a service, and this factor is configured at system commissioning and automatically changes based on the accuracy of the device selection.

The system uses a prioritisation associated with matching the device type with a use-case. For example if a user raises a complaint about watching a particular streaming service and they have never used the system 1, the system prioritizes larger display devices over smaller display sizes, so even though the streaming service can be watched on a mobile phone the system look for larger devices first (for example a Smart TV" Once the user starts to use the system 1 it prioritizes previously-used devices more than ones which have never been involved in a resolution.

2.2 Issue/Question Detection

Issue detection is done using the same technique as device and service selection, this uses a list of known issues for a given network, device or service, and coupled with synonyms, clarification questions and the user's previous issues selects the issue type to use.

2.3 Resolution Selection

Resolutions are the series of steps taken to resolve a customer issue, once the issue has been clarified using device/service and Issue detection. An issue context and the local network context then provide an enriched data set that are used to feed a resolution selection process. This process is where rules are applied for the given device, network or service and the matching rule then returns a listing of matching resolutions. There may be more than one matching resolution, so prioritisation is applied to ensure the Resolution most likely to work is selected. This prioritisation is based on a machine learning mechanism that ensures the most successful resolutions are always selected for a given issue.

The rules that are used to select the resolutions are either fixed rules that are created using a resolution recommender tool, or are dynamic rules that use a prediction engine, a machine learning enabled analytics software tool that uses issues as they are processed to train the model, then selects the most likely resolution based on the overall context. Every time an issue is processed feedback to the platform enriches the training of the model to ensure that it is always improving as end users interact with the platform.

The engine 2 enriches training of the resolution selection component 3 according to feedback arising from interactions with the engine 2. This is referred to as machine learning, and referring to FIG. 7, using both a content-based algorithm and a collaborative filtering algorithm, and one of the algorithm outputs is selected.

Figure 7:
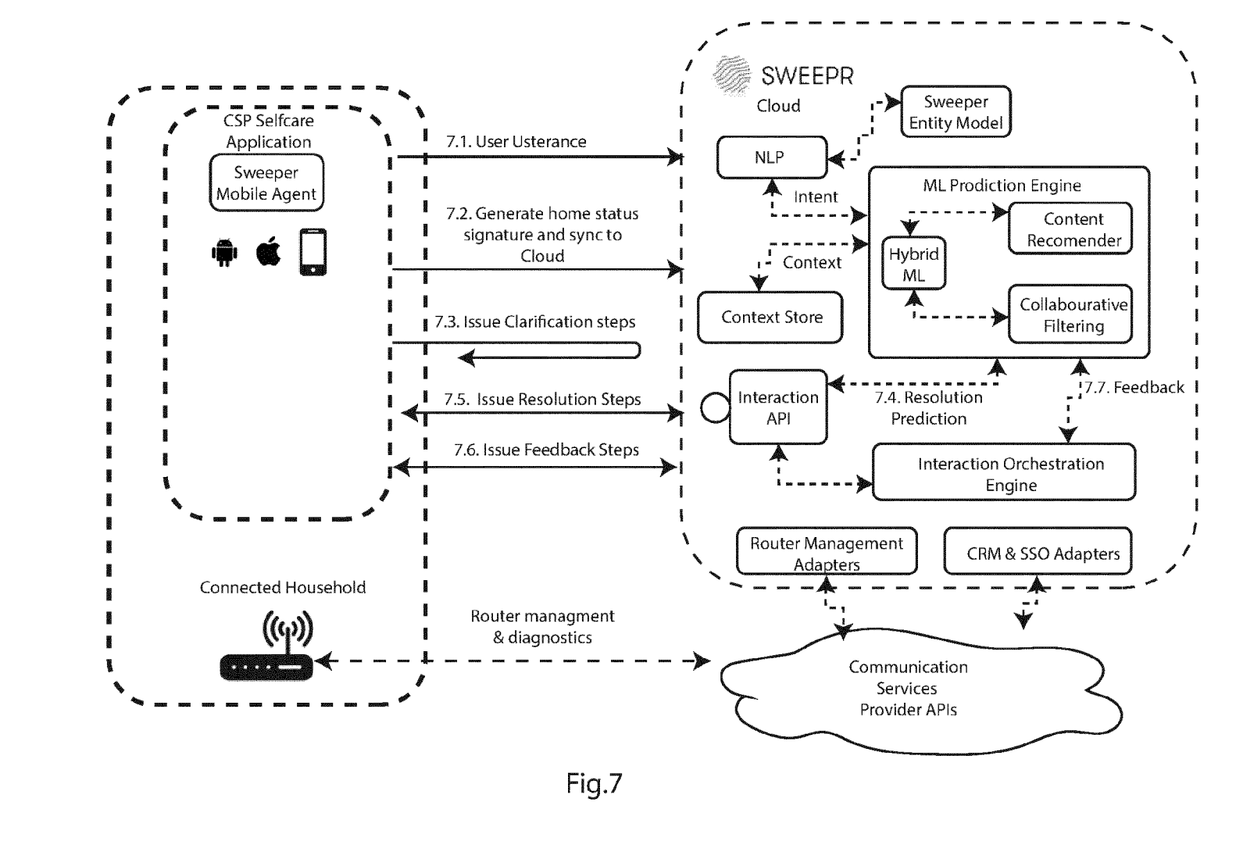
FIG. 7 is a flow diagram illustrating machine learning in a system.

Initially, training data with label values are not available, and so it is required to generate these labels before using the machine learning algorithm. A weighted average of scores for each recommended resolution (Rec1 Final Score) can be calculated based on the formula below:

$$Rec1\ Final\ Score = \frac{(CBRec1\ Score * CB\ Priority) + (CFRec1\ Score * CF\ Priority)}{CB\ Priority + CF\ Priority}$$

Where the priority of each algorithm is evaluated through multiple experiments.

The content-based algorithm has been optimised to support a 'cold start' scenario, where a new Resolution is created and the platform needs to include it as a possible Prediction, this uses a 'similarity score' for the Resolution to assess what existing Resolutions the new Resolution is similar to. This method allows new Resolutions to be selected by the Machine learning algorithm without retraining the model. In the above algorithm the parameters are:
CB Rec1 Score, content-based algorithm score
CF Rec1 Score, collaborative filtering score
CB Priority, an output value from training using the content-based algorithm
CF Priority, an output value from training using the collaborative filtering-based algorithm The priority values are in one example generated overnight in a batch training process.

2.4 Resolution Execution

Once selected, a resolution is executed. This is a series of steps that may be diagnostic checks, content, prompts, system actions or branching logic. A core orchestration engine executes the resolution flow but each step may be executed either on the server, the client interaction device, or one of the other hardware items in the environment, such as a home router or device, a "RunAt" Indicator specifies where a step needs to be executed. Server-side steps integrate with the local network via a management protocol such as TR-69 or more real-time protocols using Web sockets or other TCP based direct connections to the local network.

At the end of a resolution is a feedback stage. This is a series of steps that gather feedback from the user and may also use diagnostic checks to ensure that the issue is resolved, and then feeds the outcome back into the analytics component to drive machine learning and other analytics.

The block 2.4 feeds into the analytics engine 3 for machine learning according to feedback to update an historical context database 6. This database is accessed by the block 2.3 for enrichment of context stored by the local network interface database 20.

Local Network State Synchronisation.

The interface 10 and the home network agents 12 are configured to perform home network synchronisation using a mechanism to maintain unique device and router identity that utilises attributes of the device that are discovered by an agent 12 within the home using a range of IP protocols. The attributes are hashed to generate a unique device identity that ensures issue diagnostics do not have to rely solely on the device MAC Address.

To gather state of the home network the platform uses a network agent 12 that is deployed within the home network 11. This agent uses a number of IP-based protocols (DNS, Netbios, uPNP, Bonjour, Ping) to auto discover that home network environment. The IP protocol scans provide a set of attributes that describe each device within the home. These attributes are collated into a single hash value that then uniquely describes each device without the need for hardware-based identifiers such as MAC addresses. This solves the problem of over reliance on the MAC Address for device identity, which are becoming increasingly random and therefore unreliable. The agent 12 may be deployed on any device that is running on the home network, such as a fixed router, a gateway or an extender to a mobile device. The agent may be a hardware-based component deployed as firmware, or a software-based component which is deployed as an application onto the mobile operating system.

The home network 11 primary router identifier has a similar problem to device identification, this was typically reliant on the device MAC address. However recently this data point has been randomised by manufacturers, making identification of the router difficult, a similar approach to device identity is taken, creating a broader hash of the router identities that may include the MAC Address, plus other identifiers such as the router BSSID, Customer's account identifiers plus other attributes such as open ports and HTTP headers.

The interface 10 performs local network synchronisation in a manner which is highly efficient in terms of bandwidth. A unique identifier is generated for each device in each local network 11. On a regular basis there is an upload to the cloud-based interface server 10 so that it can stay synchronised with the servers. The extent of communication is minimised by the following process.

Locally, in the local network 11, the agent 12 determining locally if there has been a change in device identifiers or state. If not, it generates a hash signature of the identifiers and state of all of the devices in the network.

The agent 12 asynchronously uploads the signature together with a local network 11 identifier.

The interface 10 receives the hash and verifies that it is similar to the most recent one which has been received or if it matches any previous signature for that home.

The interface 10 automatically logging an unchanged status for that local network.

If there has been a change in device or state data and that state has never been seen before, the agent 12 uploads a full dataset instead of the signature, and the interface 10 receives and processes this dataset. The system does not store usage state data on the server side. The only state which is stored as part of the signature mechanism is an indication as to whether the device is connected or not. When a user reports an issue, the server gathers usage data in real-time.

In this way, the interface 10 and the agents 12 ensure prompt and accurate synchronisation, i.e. ensuring that there is as up-to-date dataset for each local network 11. This is achieved without need for regular uploads of the device identifiers and state data and hence communications bandwidth requirements are reduced. Moreover, it means that there is less processing required in the server, the above mechanism very promptly identifying any changes in each network 11 in turn.

The signature is generated using both device identifiers and state data. The state data includes the device identifiers and connectivity status, the overall local network status and may include other usage-related statistics that detail how and when devices are used. This can comprise a large dataset and use of the signature reduces the overhead of sending large datasets of cloud-based services for this purpose. The small, secure signature 'Hash' describes the connected home status, and if this status does not change between measurement intervals only this signature is transferred, however if the state changes the device level data that has changed is passed to the server for processing. This also keeps a store of all previously seen signatures and their list of devices so that minor changes in state do not require re-processing to gather previously existing device data. In this way the data is secured and data transfers are greatly reduced in both size and frequency while also ensuring a near real time status of the connected home is maintained on the cloud-based servers.

The use of the signature is very advantageous, it is only synchronised once for a given household status, thereby ensuring that multiple synchronisations of the same state do not occur, hence reducing network bandwidth and improving the efficiency of the diagnostic process by ensuring speed of availability of the home network state.

Maintenance of Connectivity

Within each local network 11 the agent 12 communicates locally with all of the devices to locally maintain a dataset. This functions even if there is a problem with direct linking of a device with the Internet, for example, for logging with the device's manufacturer. The agent 12 is programmed to communicate with the manufacturer server on behalf of the device. This ensures comprehensive connectivity for devices on the edges of WiFi strength.

A support request is received by the interface 10 most often via an application on the user's device. The request may concern functioning of a device or of a service such as live streaming of media.

Context Processing and Entity Model

The recommendation engine 2 processes each request in an automated manner It gathers a context using the connected home state as synchronized to the server along with the other context such as the user's support history and Service context, and when an issue is reported the agent activates a series of diagnostic steps to gather more context specific to the issue reported. Context such as speeds, signal strengths, device health and other such data are gathered. This context is then applied to either fixed rules or a prediction engine to select a resolution. These rules and predictions are also selected based on the entity model and the device, network or service's location within the model, this is hierarchical so it can select a resolution at any point in the hierarchy that matches the rule or prediction. This ensures that even devices or services that do not have specific resolutions built can use common resolutions from the hierarchy. For example, a resolution designed to support all streaming video services could be applied if a resolution for a specifically requested video service was not available. This hierarchy model may be edited and extended to support the ever-changing set of services, devices and networks within connected homes.

There is also a model which records the resolutions which are most suited to users. Hence the recommendation engine's blocks 2.1 to 2.4 may generate a recommendation which is not technically the best but is most suited to the particular user. This uses the skill level of the user to select appropriate resolutions, hence the user "skill level" forms part of the context and will be used in resolution selection. This ensures the platform does not select a resolution that the user in question could not be able to execute on, or understand, and the platform may select a simpler, less effective, but more appropriate resolution for that user. The skill level is dynamic, it is set at first usage based on a simple question to assess the initial level, then dynamically updates after this based on the user's speed of execution and ability to complete resolutions.

The entity model includes device types, versions and even firmware patch versions, service types and how they all behave and are layered together in a connected environment. This awareness coupled with the hierarchy allows for the automated support for new and changed devices and services without the need for explicit sets of rules, diagnostics and issue resolution for each node in the hierarchy. Machine learned issue resolution handling on top of this hierarchy allows for the support of both new and known devices and services without need for ongoing maintenance of a potentially complex hierarchy of connected devices and services. The hierarchy ensures any given device or service may be supported, by allowing for abstract Resolutions at manufacturer or service type level, for example a resolution may be built to apply to all Cookers or all Gaming services. Part of this hierarchy model means it also can support very specific handling of the features and nuances of each device and service by allowing for precedence to be given to the more specific leaf node. This approach will allow for more flexible and granular scale which will be essential for providing support for the connected home.

Dynamic Skill Levels and Associated Support Content.

The system 1 enables dynamic assessment of skill levels within the connected home user base, and this capability creates cohorts of users that have distinct skill levels and associated capabilities in handling connected home technical issues. By segmenting the user base the platform can be much more effective at driving end user interaction, promoting end user education and driving the end user to a more successful outcome. This is stored at the user level in the main platform (recommendation engine 2) database, not in the entity model. The skill level is assessed at time of registration using a small number of key questions, and is maintained as the user interacts with the platform thereafter, learning dynamically as the user's technical knowledge and skill levels change and altering how interactions are presented to achieve best outcomes in issue handling.

Message-Based Distributed Processing of Connected Local Network Support Requests.

The recommendation engine 2 provides a lightweight distributed processing approach to user-initiated device or service problem diagnostics and resolution. The local network often requires a multitude of devices and services to interact to facilitate the end user. When they have a technical issue with these devices or services the diagnostics and issue handling may invoke one or more of these devices or services, a smart connected home hub, a home router or gateway and a number of cloud based server components to gather diagnostics, make changes and interact with the end user.

The recommendation engine 2 uses an issue resolution taxonomy that carries within the issue context, state, steps to be performed, and other data such as the capabilities of that home and the skill level of the end user. Each home support issue results in an instance of this taxonomy being created, this is enriched throughout the lifetime of the issue handling and passed between the components via a message bus. An instance of the taxonomy is created and passed along with the home and user context using a distributed Message Bus. For each interaction a message topic is created and this is used to link multiple actors in the processing of the Interaction. This taxonomy supports specific device capabilities, connected home capabilities, end user skill level knowledge and other context that allows for a highly targeted, personalized and effective processing of the reported issue, this in turn increases its chances of successful resolution.

Resolution Recommendation Editor

A resolution recommendation editor is a tool which allows users to configure Resolution Rules that determine which Diagnoses and Resolutions should be applied for a specific issue with a specific device, network type or service, and the order in which they will be applied.

Diagnosis & Resolution stages

When handling an issue, the engine 2 first works to diagnose the issue and then acts to resolve it. Diagnosis and Resolutions files each set out a sequence of steps that are followed in order to accomplish these tasks. The sequence of steps takes the form of a decision tree. Resolution and diagnosis files are created in the intelligent content editor in a JSON format, and are pulled into a resolution rule if the resolution or diagnosis file shares a tag with the resolution rule.

A resolution rule is expected to contain no more than one diagnosis file, and this file is assigned the highest priority so that its decision tree is the first to be followed when the engine 2 applies a resolution rule to a reported issue. Diagnosis files are tagged with one or more tags, one of which must be the DIAGNOSE Tag, which distinguishes the diagnosis from the resolution files. Information captured by the actions and interactions in a diagnosis file are entered into the context for the household and may be used later by the Resolution files to address the issue.

A resolution rule is expected to contain one or more resolution files. Each resolution file is assigned a priority that is unique within that resolution rule and that is not the highest priority (since this is reserved for the diagnosis file). Diagnosis files are tagged with various tags.

Diagnosis and Resolution files contain any number of the following:

| Type | Description | Appears in |
|---|---|---|
| Action | An action is a task performed by the agent 12 against the device or household or performed by the engine 2 against a third party information source, for example, a speed test. | Diagnosis |
| Interaction | An interaction is an exchange that takes place between the consumer and the agent 12, to gain information from the consumer in order to further clarify or resolve the issue. | Diagnosis & Resolution |
| Requests | A question requesting information or instruction from the consumer. This could be to further clarify the issue, e.g., "Which gaming device is showing the problem? Luke's device or Tara's device?" Or to ask for direction from the consumer e.g.: "Would you like Sweepr to restart the router now?" | Diagnosis & Resolution |
| Responses | A single piece of contingent communication from the engine 2 to the end-user or from the end user to the engine 2 (may be visual or spoken) or a set of images, videos and/or text that provide educational or instructional information. | Diagnosis & Resolution |
| Technical diagnostics | Autonomous actions for diagnostic purposes, e.g., a speed test. | Diagnosis |
| User input | Information from the consumer that further clarifies the issue, e.g., Tara's gaming device, or instructs the server, e.g., Yes or No. A single utterance, tap, swipe or text entry. | Resolution |
| Closure | A command that moves to end the Interaction; ending the interaction must be jointly negotiated, e.g., Sweepr: "Have I helped you solve your problem?" Consumer: "Yes." | Resolution |

Local Network Context

The context is a collection of attributes that catalog all information gained by the engine 2 in relation to a local network. The attributes take the form of key:value pairs, in which the keys have been predefined for each device, service, network type and issue type, and the values come from a variety of sources that include the NLP aliases that have been matched to user utterances; the user profile; any previous history with the same device, service and/or issue type; and data from the diagnostics, e.g., a speed test.

The engine 2 uses the household context to identify the intent and the location in the hierarchy for the device, service or network with the issue, and then compares the information in the context to the expressions for the resolution rules at that place in the hierarchy in order to select a Resolution Rule appropriate to the issue.

Service Context.

The Service context is an additional set of data about the service that the consumer may have an issue with; this includes the minimum bandwidth and latency for high quality service operation, a real-time check of the service status for the given location, and a prediction of the likelihood of a possible problem with the service based on analytics of the number of consumers reporting an issue with the service.

Resolution Rules

A resolution recommendation editor is used once a range of resolutions and the device, service, network and issues hierarchies have been created in the intelligent content editor. The resolution recommendation editor allows users to create categories of device, network or service at any level in the hierarchy. These categories are called resolution rules. An example of a resolution rule is a "charger issues" rule, which contains a diagnosis and set of resolutions that handle any charger problems for a device at that level in the hierarchy. If the resolution rule "charger issues" is positioned in the device hierarchy at Device>MakeX>ModelY, then the engine 2 will use the diagnosis and resolutions in this rule to handle problems for this device.

Tags (FIG. 3)

Each resolution rule is tagged with a set of key words that are used by the engine 2 to associate appropriate diagnosis and resolutions with a resolution rule. Some examples of tags are "RESET", or "FROZEN", as well as "DIAGNOSE". The use of tags provides a loose coupling between the rule logic and the diagnostic and resolution stages that ensures an easy migration from a rule-based selection mechanism to a machine-learned, data centric, prediction model. This will allow for a given domain to move from rule-based to prediction-based by replacing the rule evaluator with a prediction evaluator.

To demonstrate how tags allow the engine 2 to couple resolutions with a resolution rule, the different tags are represented by TAG1, TAG2, TAG3 etc. Resolution RuleA is tagged with TAG1, TAG2 and TAG13. The resolutions that share one or more of these tags are Resolution2 and Resolution1, so these are the resolutions that will be coupled with Resolution RuleA. Similarly, Resolution RuleB is tagged with TAG11, TAG12, TAGS, TAG10 and TAG13. The resolutions that share one or more of these tags are Resolution1, Resolution6 and Resolution7, so these are the resolutions that will be coupled with Resolution RuleB. Resolution3, Resolution4 and Resolution5 are not used by Resolution RuleA or RuleB, and indeed, may not be used by any Resolution Rules.

Expressions

FIG. 4 gives an example screen for expression rules. Each resolution rule has an expression associated with it. An expression is a set of conditions that are defined with Boolean, conditional and equality operators, and which contain one or more attributes with stated values. Expressions are evaluated as True or False when compared to the information captured about the reported issue in the household context.

A simple example of an expression:
ENTITY_TYPE=="network"
&&
CLOUD_RSSI>=−50
&&
cloud_NetworkSpeed<500

This expression asks if the information in the context for that household (Household context) contains an attribute called ENTITY_TYPE that is populated with the value "network" AND an attribute called CLOUD_RSSI that is populated with a value that is greater or equal to −50 AND an attribute called cloud_NetworkSpeed that is populated with a value that is less than 500. If it does, then this Resolution Rule is selected and its resolutions are applied to the issue.

An example of information in the household context which would result in the expression above evaluating to true is:
ENTITY_TYPE="network"
CLOUD_RSSI=−50
cloud_NetworkSpeed=450

Clauses

An expression is made up of clauses. Each clause in an expression is made up of an attribute, an option and a value, such as ENTITY_TYPE="network". There may be multiple clauses in an expression. These are described below:

| Field name | Description |
| --- | --- |
| Attribute | A characteristic about the reported issue. An extensive list of attributes exist on the system that range from DEVICE_ISSUE to CLOUD_RSSI and that allow every piece of information that is captured about an issue to be logged against an attribute in the context for that Household. Attributes are created and managed by the Sweepr team. |
| Option | An equality operator, such as: Is equal to<br>Is not equal to<br>Contains<br>Is greater than<br>Is less than<br>Is greater than or equal to<br>Is less than or equal to<br>Is after<br>Is before<br>True<br>False |
| Value | The value of the attribute. Values are derived from the information captured by the system 1 from the interaction with the home user, e.g. the nature of the reported issue, and with information captured autonomously by The system 1 about the household e.g., the result of a speed test. This information is processed by the NLP Alias engine, which matches home user utterances to a the system 1 Alias, which in turn allows The system 1 to identify each attribute that is appropriate to the issue and populate it with the relevant alias. |

Groupings

Clauses can be grouped together into a conditional expression using the Boolean operators AND and OR. For example:
(DEVICE_NAME=="iPhoneX"||"iPhoneXS") && (ISSUE_NAME=="Slow"||"Lag") which would evaluate to true if the household context contained the Device name "iPhoneX" or "iPhoneXS", and if the Issue name was "Slow" or "Lag":

Priority

Each resolution in a resolution rule is assigned a priority. The priority of a resolution determines the order in which the resolutions in a resolution rule are applied to an issue, with the resolution with the highest priority applied first. If the resolution rule contains a diagnosis, the diagnosis is always assigned a priority of 1 so that it is run before the resolutions.

For example, the resolution rule "Nest>Nest Protect Smoke Detector>Unexpected Alarm1" contains the following resolutions, where the priority is in brackets:
AlarmDiagnose (1)
SmokeAlarmFirmware (4)
SmokeAlarmBattery (2)
SmokeAlarmConnectivity (3)
SmokeAlarmHardware (5)
The order in which the files will be applied are:
AlarmDiagnose (1)
SmokeAlarmBattery (2)
SmokeAlarmConnectivity (3)
SmokeAlarmFirmware (4)
SmokeAlarmHardware (5)

Resolutions are expected to have a priority that is unique within a resolution rule; however, in the event that the same priority value is assigned to more than one resolution in a resolution rule, The system 1 will select randomly one of these resolutions and apply it to the issue.

Setting a Priority

Priority of a resolution is set initially by a permissioned user via the intelligent content editor. However, any existing priority value is subject to change by the system 1 as a result of its feedback and associated machine learning. The engine 2 is able to intervene in a resolution rule to change the priority of its resolutions if it has learnt that a lower priority resolution is more successful at addressing issues than the resolutions with higher priority.

Resolution Rule Fallback

If the issue is not resolved by the resolutions in a resolution rule, the engine 2 searches for another resolution rule that is at the same level in the hierarchy, and checks to see if the information in the household context meets the criteria set out in its expression. If the expression criteria are met, then the engine 2 will apply the diagnosis and resolutions in this next resolution rule.

How Resolution Rules Address Issues

When an issue is raised by a home user or detected by the agent 12, the engine 2 will pick out the key words from the home user communication and match them to an NLP alias. The relevant aliases are then used to populate attributes in the context for the household. The attribute values are then compared to the attribute values in the Resolution Rule expressions, and the Resolution Rule for which the expression returns true is selected to apply to the reported issue.

If there is a diagnosis in the resolution rule, it is run against the issue first to further clarify the nature of the problem. Then the Resolution with the next highest priority is applied to the issue. If this Resolution is not successful in addressing the issue to the satisfaction of the home user, the Resolution with the next highest priority is applied, and so on.

When the engine 2 finds that a resolution has addressed the issue, it asks the home user via the agent 12 if they are satisfied with the outcome, and if the home user confirms that the issue has been addressed, then the issue is closed. If the engine 2 has applied every resolution in a resolution rule and the issue has not been fixed to the satisfaction of the home user, then the system will ask the home user if they wish to escalate the issue to the care team at the client. If the home user elects to escalate the issue, then it is added to the list of open issues in the customer care manager dashboard for investigation by the care team.

Referring to FIG. 5, a simple example of operation of the system 1 is illustrated. A user communicates (1) an issue using his phone, and (2) this is passed to an API for intent extraction by the agent 12. A message is transmitted (3) to a REST API of the engine 2, and from there to an interaction engine which is a combination of the selection 2.1 and detection 2.2 components of the engine 2. A topic (which is a type of message with a unique identifier linked to the specific Interaction) is created (4) and a message bus sends the topic with an interaction context to the user's device. The device then communicates with the engine 2 and other parties such as in-home devices or routers using this Topic. Thereafter all communications for this interaction come in the form of messages related to the unique 'Topic', this allows for complex multi-stage, distributed processing of an Interaction. There is also, within the engine 2, updating of the analytics engine 3.

A more detailed example of this process is below:
1. Receive incident report:
  "My doorbell isn't working"
2. Extract key words:
  "doorbell"
3. Search the household's devices and identify that the home user has one doorbell in their connected home, which is a Ring.com doorbell.
4. Search the household's context, which is a record of the household that is built up over time, and identify that the home user has reported that their doorbell has had video problems on a previous occasion.
5. Gather more information:
  "Hi Alan, can you further describe the problem please. Is it the same video problem with your doorbell that you saw 2 weeks ago?"
6. Receive further information.
  "Yes. The video screen is blank. It is black and I can't see anything."
7. Extract keywords
  "video"
  "screen"
  "blank"
  "black"
8. Search the alias listing to identify aliases for any of these keywords and populate the Attributes with the aliases and any other information from the context, for example:
  DEVICE: DOORBELL
  MANUFACTURER: RING.COM
  ISSUE: VIDEO BLANK 9. Select the Resolution Rule that matches the device context and the most Tags:

| | |
|---|---|
| Resolution Rule | "Ring.com > Doorbell > Doorbell Video" |
| Tags | "doorbell" "video" |
| Diagnosis & Resolutions (priority in brackets) | DoorbellDiagnose(1) |
| | DoorbellFirmware (4) |
| | DoorBellBattery (2) |
| | DoorbellConnectivity (3) |
| | DoorbellHardware (5) |

10. Apply the Diagnosis DoorbellDiagnose (it has the highest priority) in the Resolution Rule "Ring.com>Doorbell>Doorbell Video" in order to gather more information, such as:
  "Does the doorbell ring if you press the button on it?"
  Yes/No
11. Receive further information:
  "No".
12. Continue to follow the decision tree in the Diagnosis in order to gather more information, such as:
  "I can see that you are having some very cold weather again. When temperatures drop to 0° C. (32° F.), the battery in your doorbell may be prevented from charging, even if it's hardwired to your electricity supply. Could you please check the battery life, and let me know if the battery is ok?"
13. Receive further information:
  "The doorbell battery is dead."
14. Apply the Resolution DoorbellBattery in the Resolution Rule "Ring.com>Doorbell>Doorbell Video" in order to address the reported issue.
  "The battery will charge if it is in a warmer environment. Bring the entire doorbell device inside and charge the battery with a USB cable."
15. Assess if the Resolution is successful. Ask the home user if they are happy with the outcome, and if they are, close the issue.
  "Have I helped you solve your problem?"
  If not, apply the Resolution with the next highest priority in the Resolution Rule:
  "Ring.com>Doorbell>Doorbell Video>DoorbellConnectivity"
16. Repeat step 15 until the Resolution with the lowest priority in the Resolution Rule has been applied and if the issue is not fixed, ask the home user if they would like to escalate the issue to the Care Team:
  "I am sorry I have not been able to resolve the problem you reported. Would you like me to have a member of our Care Team contact you to talk about your problem?"
17. If home user wishes to escalate the issue, add it to the list of Open Issues in the Customer Care Manager dashboard.

Figure 6:
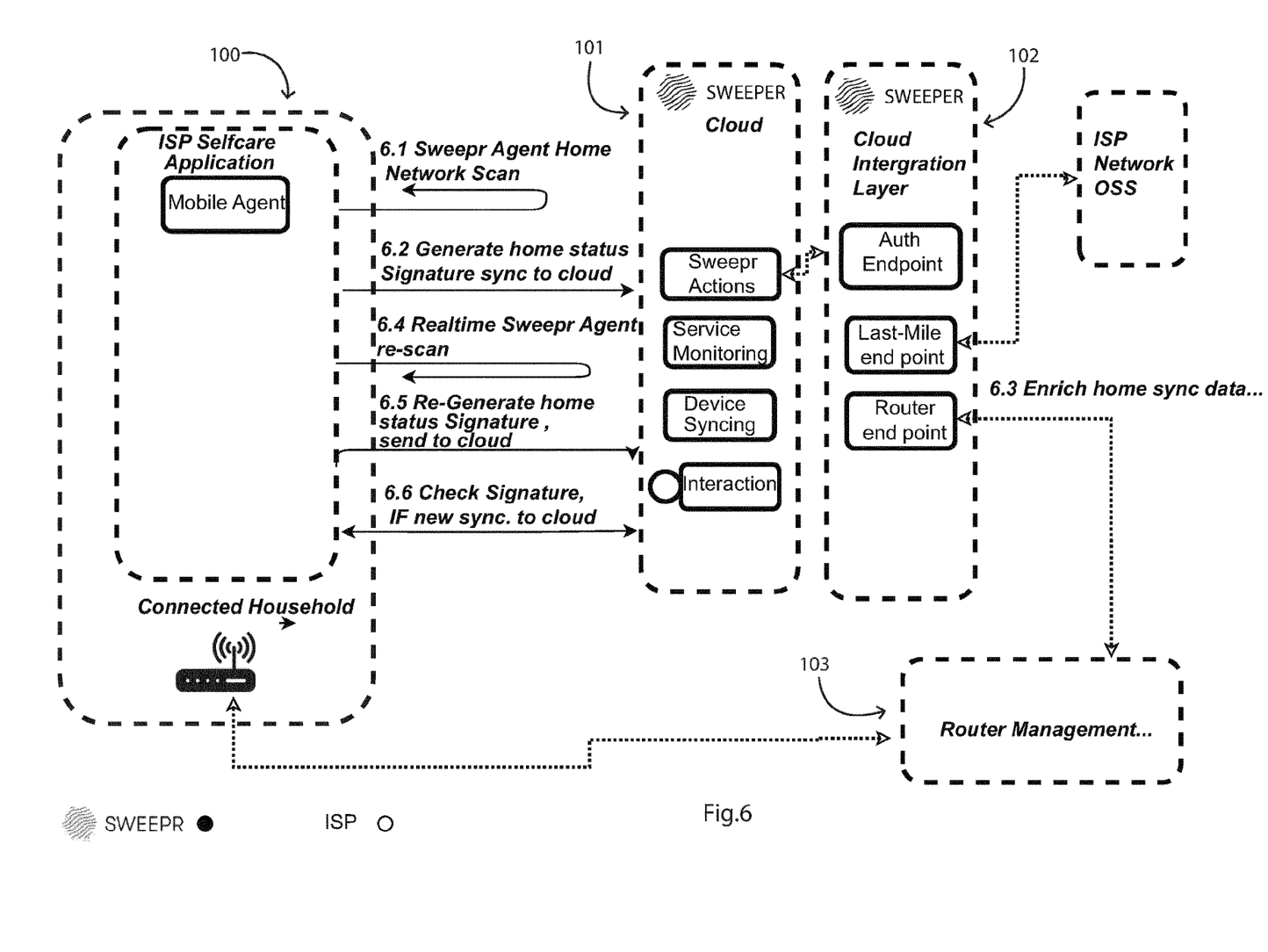
FIG. 6 is a diagram illustrating architecture of an alternative system, and the major messaging flows between components.

Referring to FIG. 6 an alternative automated support system for local networks of connected devices is illustrated. There are local network agents 100 each comprising a digital processor, a memory, a local communications wireless interface for communicating locally with devices in the local network, and remotely with cloud-based servers. There is a group of one or more servers with digital processors, Internet communication interfaces, memory, and storage, in this case grouped into a first group 101 and a second group 102. These servers 101 and 102 have interfaces for communicating with the local network agents 100 and functionality of a recommendation engine to dynamically communicate with the local network agents via said interface and a routers 103 to capture support requests concerning devices and services, to perform work flow processing to generate a resolution for such support requests, and to communicate the resolution to the local network agents 100. The first group of servers include software functions for actions in response to support requests, and for service monitoring, device synchronization, and interactions via an API. The second group 102 include authentication, "Last-Mile", and router end points. The major steps for agent 100 synchronization are the following steps:

6.1, local network scan;
6.2, generation of local network status signature;
6.3, enrichment of home synchronization data via the routers 103;
6.4 real time agent 100 re-scan and, 6.4 sending of the new signature to the servers 101 and 102;
6.6 checking the signature.

This aspect is advantageous because it uses the routers 103 to, in real time enrich the local network ("home") network synchronization data and generate and send a fresh signature.

Referring to FIG. 7 a machine learning flow is illustrated in more detail, as follows:

7.1 User utterance,
7.2 generate a local network signature and synchronize it with the Cloud (engine 2),
7.3 Issue clarification steps,
7.4 machine learning prediction engine operation implementing the content-based algorithm and the collaborative-filtering algorithm, and the hybrid ML (machine learning) function selecting the output as described above,
7.5, Issue resolution steps are implemented,
7.5 Issue feedback steps are provided.

Device Recognition Identifier

The embedded agent 12 implements a synchronization protocol to efficiently gather a consistent snapshot of unique devices in the local network. Typically, a device has a MacAddress, an IP address and a DNS name on a network, but due to privacy reasons often these details are not available to modern mobile device operating systems.

A device will often (usually after a device has gone offline for a period) be given a new random IP address, and so the IP address cannot be relied upon after a given period (usually 15-30 minutes after it has gone offline) and even a DNS Name has stopped being made available within the local environment of some networks by some routers, for privacy reasons.

However, the apparatus of the invention is configured to provide improved device recognition to address this problem.

For an individual device the agent 12 provides an alternative to the MacAddress in the form of a unique 64-bit hash code for a given device based on combining specific fields retrieved from scanning mechanisms during a scan of the network. In one example the identifier has a value as HASH64(Idenitifer1+Idenitifer2+Idenitifer3 . . . ) where the IdentifierNs are found using different protocols. In various examples they are some or all of a DNS name, a Bonjour name, a specific hardware identifier, a UPNP (Universal Plug and Play) identifier, a device name, a firmware identifier, a list of open ports.

This provides a consistent set of identifiers for a given device using all the protocols available to the agent 12 and generates a consistent 64-bit hash value as an alternative to a MacAddress.

A variation of this approach arises where the agent 12 can only get an assigned IP address but only needs it for consistency for a short and defined period of time. In this case the agent uses the IP address+a valid time period as a "temporal Hash". This can be useful in situations where the agent can only get an IP address but needs to persist and recognise a device 'consistently' on a home network for a given period of time, for example, during and after a router reboot, or when a device has goes offline and online intermittently. With this 'hash' the system can have some level of confidence that the same device is 'seen' in the absence of other mechanisms.

Network Recognition Identifier

For a network router a typical way of identifying it was using a BSSID (basis service set identifier) (or SSID) where the BSSID is a router obfuscated version of a MacAddress and the SSID is the visible name of the network router e.g. the WIFI name. The BSSID could be used to recognise the router manufacturer and possibly the router model and therefore it is very useful for a number of typical diagnostic use-cases, but the BSSD can be randomised for privacy reasons. Also, a problem with using the BSSID for routers using both the 2.4 GHz and 5.0 GHz WiFi bands when each band is given different non-related BSSIDs, therefore causing inconsistencies when devices connect via 2.4 or 5.0 to the same network.

So for network router recognition the agent 12 uses a similar approach using a HASH (identifier1+identifier2 . . . )—using alternative known protocols to retrieve identifiers for a given local network.

It will be appreciated that the invention provides a technical infrastructure for efficient and comprehensive automated processing of support requests related to a device local network. Human involvement is minimized and, in many cases, eliminated due to the comprehensiveness of the automation.

The invention is not limited to the embodiments described but may be varied in construction and detail.

The invention claimed is:

1. An automated support system for local networks of connected devices, the system comprising:
    a plurality of local network agents each comprising a digital processor, a memory, a local communications wireless interface for communicating locally with devices in one of said local networks, and remotely with cloud-based servers, and a group of one or more servers with digital processors, Internet communication interfaces, memory, and storage, configured to provide:
        an interface for communicating with the local network agents,
        a recommendation engine configured to dynamically communicate with the local network agents via said interface to capture support requests concerning devices and services, to perform work flow processing to generate a resolution for such support requests, and to communicate the resolution to the local network agent,
    wherein the recommendation engine is configured to automatically generate a context for each support request, the context including historical resolution data for the associated local network, and/or device, and/or service, and
    wherein the interface and the local network agents are configured to perform local network synchronization with low bandwidth overhead by the agents asynchronously generating a signature and transmitting said signature to the interface to indicate status of all of the devices in their associated network, and said synchronization is performed so that only previously un-recorded device data needs to be synchronized, and
    wherein each agent is configured to automatically generate a signature of identifiers of all of its associated devices if there has been no change in device or state since a last upload, and to upload a full device and state dataset if there has been a change,
wherein the recommendation engine comprises a resolution selection component configured to select a resolution to an issue by executing rules matched to the context to return a listing of matching resolutions, and to apply prioritization to a plurality of matching resolutions based on a machine learning mechanism.

2. The automated support system as claimed in claim 1, wherein the state data includes device speeds, connectivity status, overall local network status, and usage-related related statistics about how and when devices are used.

3. The automated support system as claimed in claim 1, wherein each agent is configured to maintain connectivity of all devices in its local network, including of devices which are not configured to directly communicate with the Internet by being at local network edges, in which the agent is configured to use a local area network protocol to allow said devices to communicate with the agent.

4. The automated support system as claimed in claim 1, wherein the recommendation engine comprises a series of components arranged to operate in sequence to process a support request, said components comprising:
   a selection component configured to select a device or service applicable to the support request,
   an issue detection component configured to detect an issue for the support request, the resolution selection component, and
   a resolution execution component configured to communicate with the local network agent for resolving the issue of the support request by execution of a resolution rule.

5. The automated support system as claimed in claim 1, wherein the recommendation engine comprises a series of components arranged to operate in sequence to process a support request, said components comprising:
   a selection component configured to select a device or service applicable to the support request,
   an issue detection component configured to detect an issue for the support request, the resolution selection component configured to select a resolution to the issue, and
   a resolution execution component configured to communicate with the local network agent for resolving the issue of the support request by execution of a resolution rule; and
   wherein said selection component and said issue detection component each comprises a Natural Language Processing engine and a core entity model to identify a relevant device or service or issue by using synonyms for known devices and services and issues stored on the recommendation engine and being configured for interaction with the local network agent if the device or service or issue is unknown or ambiguous; and said components are configured to automatically generate a context for each of the selected device or service and the selected issue, said context being an enriched data set that is fed to the resolution selection component.

6. The automated support system as claimed in claim 1, wherein the recommendation engine comprises a series of components arranged to operate in sequence to process a support request, said components comprising:
   a selection component configured to select a device or service applicable to the support request,
   an issue detection component configured to detect an issue for the support request, the resolution selection component, and
   a resolution execution component configured to communicate with the local network agent for resolving the issue of the support request by execution of a resolution rule wherein said resolution selection component is configured to select resolutions which are either fixed rules that are created using a resolution recommender tool, or are dynamic rules that use a prediction engine, said prediction engine being a machine learning enabled analytics software tool that uses issues as they are processed to train a model, and then selects the most likely resolution based on the overall context; and
   wherein the resolution execution component is configured to execute a series of steps including diagnostic checks, content, prompts, system actions and branching logic, and comprises a orchestration engine which is configured to execute a resolution flow of steps executed by the recommendation engine and the local network agent; and wherein said resolution component comprise a feedback stage configured to gather feedback from the user and to use diagnostic checks to ensure that the issue is resolved, and then feeds outcome data back into an analytics engine to drive machine learning according to feedback to update an historical context database.

7. The automated support system as claimed in claim 1, wherein the recommendation engine comprises a series of components arranged to operate in sequence to process a support request, said components comprising:
   a selection component configured to select a device or service applicable to the support request,
   an issue detection component configured to detect an issue for the support request,
   the resolution selection component configured to select a resolution to the issue, and
   a resolution execution component configured to communicate with the local network agent for resolving the issue of the support request by execution of a resolution rule; and
   wherein the recommendation engine comprises an entity model and is configured to automatically update said entity model including device types, versions and firmware patch versions, service types and how they behave and are layered together in a connected environment, the structure of the entity model being in a hierarchy in which machine learned issue resolution handling on top of this hierarchy allows for the support of both new and known devices and services without need for ongoing maintenance of a potentially complex hierarchy of connected devices and services.

8. The automated support system as claimed in claim 1, wherein the recommendation engine is configured to perform a lightweight distributed processing mechanism for user-initiated support requests, in which there is a support request issue resolution taxonomy that carries for each context, state, steps to be performed, and data concerning capabilities of the local network and the skill level of the end user.

9. The automated support system as claimed in claim 1, wherein the recommendation engine is configured to perform a lightweight distributed processing mechanism for user-initiated support requests, in which there is a support request issue resolution taxonomy that carries for each context, state, steps to be performed, and data concerning capabilities of the local network and the skill level of the end user; and wherein the resolution selection component is configured to generate an instance of a taxonomy, and the resolution selection and the resolution execution component are configured to enrich via a message bus the taxonomy throughout the lifetime of a support request; and wherein said components are configured to, for each interaction on said message bus, generate a message topic to link a plurality of hardware devices or systems in the processing of the support request.

10. The automated support system as claimed in claim 1, wherein the recommendation engine is configured to perform a lightweight distributed processing mechanism for user-initiated support requests, in which there is a support request issue resolution taxonomy that carries for each context, state, steps to be performed, and data concerning capabilities of the local network and the skill level of the end user; and wherein the resolution selection component is configured to generate an instance of a taxonomy, and the resolution selection and the resolution execution component are configured to enrich via a message bus the taxonomy throughout the lifetime of a support request; and wherein said components are configured to, for each interaction on said message bus, generate a message topic to link a plurality of hardware devices or systems in the processing of the support request; and
wherein the system is configured to perform the steps of:
receive at the local network agent a support request from a local network device which executes an API to perform intent extraction,
the local network agent transmitting a message to an API of the recommendation engine, and from there to an interaction program, which recognizes an interaction in response to the support request,
the interaction program generating a topic message with a unique identifier linked to the interaction and a message bus sends the topic with an interaction context to the local network device, and
the recommendation engine subsequently recognizing messages from the local network as relating to this interaction by recognizing the associated topic.

11. The automated support system as claimed in claim 1, wherein the recommendation engine comprises a series of components arranged to operate in sequence to process a support request, said components comprising:
a selection component configured to select a device or service applicable to the support request,
an issue detection component configured to detect an issue for the support request,
the resolution selection component configured to select a resolution to the issue, and
a resolution execution component configured to communicate with the local network agent for resolving the issue of the support request by execution of a resolution rule, wherein each resolution rule is tagged with a set of key words that are used by the recommendation engine to pull an appropriate diagnosis and resolution into a resolution rule, said tags coupling resolutions with a resolution rule, in which some resolution rules share tags.

12. The automated support system as claimed in claim 1, wherein the recommendation engine comprises a series of components arranged to operate in sequence to process a support request, said components comprising:
a selection component configured to select a device or service applicable to the support request,
an issue detection component configured to detect an issue for the support request,
the resolution selection component configured to select a resolution to the issue, and
a resolution execution component configured to communicate with the local network agent for resolving the issue of the support request by execution of a resolution rule, wherein each resolution rule is tagged with a set of key words that are used by the recommendation engine to pull an appropriate diagnosis and resolution into a resolution rule, said tags coupling resolutions with a resolution rule, in which some resolution rules share tags; and wherein said tags provides a coupling between rule logic and resolution stages to facilitate migration from a rule-based selection mechanism to a machine-learned, data centric, prediction model.

13. The automated support system as claimed in claim 1, wherein the system is configured to generate the context as a collection of attributes that catalogue all information gained by the engine in relation to a local network, said attributes taking the form of key:value pairs, in which the keys have been predefined for each device, service, network type and issue type, and the values are imported from a plurality of sources that including NLP aliases that have been matched to user utterances; and/or user profile; and/or data concerning history of processing support requests for the same device or issue type; and data from a diagnostics tool, and wherein said diagnostic tool includes a communication data transfer rate tool.

14. The automated support system as claimed in claim 1, wherein the system is configured to generate the context as a collection of attributes that catalogue all information gained by the engine in relation to a local network, said attributes taking the form of key:value pairs, in which the keys have been predefined for each device, service, network type and issue type, and the values are imported from a plurality of sources that including NLP aliases that have been matched to user utterances; and/or user profile; and/or data concerning history of processing support requests for the same device or issue type; and data from a diagnostics tool, and wherein said diagnostic tool includes a communication data transfer rate tool; and wherein the recommendation engine is configured to identify a location in a hierarchy for a device, service or network with a support request issue, and to compare the information in the context to expressions for resolution rules at that place in the hierarchy in order to select a resolution rule appropriate to the issue.

15. The automated support system as claimed in claim 1, wherein said local network agents are configured to send, in real time, enriched local network synchronization data, to generate a fresh signature and send said signature to the servers.

16. The automated support system as claimed in claim 1, wherein the recommendation engine is configured to perform device selection for a given service request according to a learned confidence factor that associates device types with a service, and said factor automatically changes based on the accuracy of the device selection.

17. The automated support system as claimed in claim 1, wherein the recommendation engine is configured to enrich training of the resolution selection component according to feedback arising from interactions with the engine in a machine learning process, in which a content-based algorithm and a collaborative filtering algorithm are executed for resolution selection, and one of the algorithm outputs is selected.

18. The automated support system as claimed in claim 1, wherein the recommendation engine is configured to enrich training of the resolution selection component according to feedback arising from interactions with the engine in a machine learning process, in which a content-based algorithm and a collaborative filtering algorithm are executed for resolution selection, and one of the algorithm outputs is selected; and wherein the system is configured to execute a training process in which priority values for a content-based algorithm and for a collaborative filtering algorithm are determined, and are used in real time as part of a combined algorithm for resolution selection.

19. The automated support system as claimed in claim 1, wherein the recommendation engine is configured to enrich training of the resolution selection component according to feedback arising from interactions with the engine in a machine learning process, in which a content-based algorithm and a collaborative filtering algorithm are executed for resolution selection, and one of the algorithm outputs is selected; and wherein the system is configured to execute a training process in which priority values for a content-based algorithm and for a collaborative filtering algorithm are determined, and are used in real time as part of a combined algorithm for resolution selection; and wherein the system is configured to automatically generate a weighted average of scores for each recommended resolution (Rec1 Final Score) according to:

$$Rec1\ Final\ Score = \frac{(CBRec1\ Score * CB\ Priority) + (CFRec1\ Score * CF\ Priority)}{CB\ Priority + CF\ Priority}$$

where,
CB Rec1 Score is the content-based algorithm score,
CF Red Score is the collaborative filtering score,
CB Priority is an output value from training using the content-based algorithm,
CF Priority is an output value from training using the collaborative filtering-based algorithm.

20. The automated support system as claimed in claim 1, wherein each agent is configured to generate a unique hash code for a local network device by combining specific device data items retrieved from a scan of the network; and wherein the specific identifiers include some or all of a DNS name, a specific hardware identifier, a UPNP (Universal Plug and Play) identifier, a device name, a firmware identifier, and a list of open ports; and wherein the agents are configured to uniquely identify a network by generating a hash of specific network data items.

21. The automated support system as claimed in claim 1, wherein the recommendation engine is configured to record resolutions which are most suited to users, including resolutions which are not technically the best but are most suited to the particular user; and wherein the recommendation engine is configured to use user skill level as part of a context for resolution selection; and wherein the recommendation engine is configured to dynamically update the skill level, in which it is set at a first usage based on a simple question to assess an initial level, and then is dynamically updated based on the user's speed of execution and ability to complete resolutions.

22. A method of processing a support request arising from a local network of connected devices, the method being performed by a system of claim 1, and the method comprising steps of:
a local network agent each sending a support request to the recommendation engine, the recommendation engine dynamically communicating with the local network agent via said interface to capture the support request and performing work flow processing to generate a resolution for the support request, and communicating the resolution to the local network agent.

23. A non-transitory computer program product storing software code for executing steps of a method of claim 22 when executed by a digital processor.

* * * * *